United States Patent [19]

Caballero

[11] Patent Number: 5,314,608

[45] Date of Patent: May 24, 1994

[54] NICKEL-COBALT-BORON ALLOY, IMPLEMENT, PLATING SOLUTION AND METHOD FOR MAKING SAME

[75] Inventor: Luis X. Caballero, Mexico City, Mexico

[73] Assignee: Diamond Technologies Company, Louisville, Ky.

[21] Appl. No.: 45,977

[22] Filed: Apr. 9, 1993

Related U.S. Application Data

[62] Division of Ser. No. 594,570, Oct. 9, 1990, Pat. No. 5,213,907.

[51] Int. Cl.$^5$ .............................................. C25D 3/56
[52] U.S. Cl. ..................................... 205/238; 205/255
[58] Field of Search ....................... 205/238, 255, 257; 204/DIG. 9

[56] References Cited

U.S. PATENT DOCUMENTS

| | | | |
|---|---|---|---|
| 2,470,775 | 5/1949 | Jernstedt et al. | 204/43 |
| 2,743,177 | 4/1956 | Cape | 75/171 |
| 2,990,296 | 6/1961 | Hoke | 117/136 |
| 3,045,334 | 7/1962 | Berzins | 29/194 |
| 3,062,666 | 11/1962 | McLeod | 106/1 |
| 3,268,353 | 8/1966 | Melillo et al. | 117/47 |
| 3,295,999 | 1/1967 | Klein et al. | 106/1 |
| 3,297,418 | 1/1967 | Firestone et al. | 29/199 |
| 3,378,400 | 4/1968 | Sickles | 117/160 |
| 3,432,338 | 3/1969 | Sickles | 117/130 |
| 3,533,922 | 10/1970 | Semienko et al. | 204/43 |
| 3,562,000 | 2/1971 | Parker | 117/130 |
| 3,674,447 | 7/1972 | Bellis | 29/196.6 |
| 3,753,667 | 8/1973 | Metzger et al. | 29/105 |
| 3,917,464 | 11/1975 | Pearlstein et al. | 106/1 |
| 4,002,778 | 1/1977 | Bellis et al. | 427/98 |
| 4,036,709 | 7/1977 | Harbulak | 204/43 T |
| 4,055,706 | 10/1977 | Galmiche et al. | 428/652 |
| 4,059,217 | 11/1977 | Woodward | 228/181 |
| 4,279,707 | 7/1981 | Anderson et al. | 204/43 T |
| 4,440,609 | 4/1984 | Blakeslee et al. | 204/43 T |
| 4,621,026 | 11/1986 | Robinson | 428/422 |
| 4,661,216 | 4/1987 | Anderson et al. | 204/44.5 |
| 4,833,041 | 5/1989 | McComas | 428/610 |
| 4,894,124 | 1/1990 | Walsh et al. | 204/30 |
| 5,019,163 | 5/1991 | McComas | 106/1.22 |

FOREIGN PATENT DOCUMENTS

| | | | |
|---|---|---|---|
| 60-217678 | 10/1985 | Japan | |
| 61-67976 | 4/1986 | Japan | |
| 62-17192 | 3/1987 | Japan | C25D 3/56 |
| 2149692 | 6/1990 | Japan | C25D 3/56 |

OTHER PUBLICATIONS

Teschke & Soares/Electrodeposition of Nickel/Feb. 1983 J. Electrochem. Soc./vol. 130 No. 2-pp. 306-310.
Mallory & Lloyd/The Effect of Pulsed D-C-(pp. 1-5) Current on Electroless Nickel-plating/ Allied-Keute Div., Witco Chem. Corp.
XU Wei-Yuan/Nickel Plating by Pulse Current-/Research Institute of Electronics/Academia Sinica. Beijing, China.

*Primary Examiner*—John Niebling
*Assistant Examiner*—Kishor Mayekar
*Attorney, Agent, or Firm*—Polster, Lieder, Woodruff & Lucchesi

[57] ABSTRACT

A dense, smooth, ductile, hard, highly reflective, corrosion-resistant, temperature resistant, and wear-resistant crystalline alloy of nickel, cobalt and boron. The alloy is epitaxially electrodeposited on an activated substrate using a pulsed square wave current. The epitaxial deposition occurs in an electrolytic bath containing nickel ions, cobalt ions, complexing agents, and an amino borane compound at a moderately low pH level and moderate temperature. An insoluble, solid catalyst, preferably palladium, causes the alloy to diffuse into the surface of the substrate and become bonded by a polar-covalent bond to it. Implements coated with the alloy, as well as plating solutions and methods for making the alloy are also disclosed.

14 Claims, 6 Drawing Sheets

NICKEL-COBALT-BORON ALLOY, IMPLEMENT, PLATING SOLUTION AND METHOD FOR MAKING SAME

This is a divisional of copending application Ser. No. 07/594,570, filed on Oct. 9, 1990, now U.S. Pat. No. 5,213,907.

BACKGROUND OF THE INVENTION

This invention relates to the epitaxial electrodeposition of an alloy which is remarkably dense, hard, ductile, reflective, and resistant to heat, corrosion, and wear, as deposited. More particularly, this invention relates to an alloy containing nickel, cobalt, and boron (Ni-Co-B), and the electrodeposition of the alloy on a substrate at low pH and moderate temperature to form a tenacious bond with the substrate.

The epitaxial deposition of a metal alloy by an electrochemical process or chemical reduction on a surface of a substrate to modify surface characteristics of the substrate for functional or decorative purposes is well known in the art. Prior art systems disclose Ni-B, Co-B, Ni-Co, Ni-Fe, Co-Fe, Ni-Co-Fe, and Ni-Co-Tl-B alloys which are deposited on substrates to make them hard and corrosion resistant. The patent literature discloses an ongoing effort to produce such coatings which are still harder and more corrosion resistant.

The electrolytic deposition processes produce substantial amounts of sludge, which foul the plating baths and require their replacement at intervals. It has been recognized that increasing the life of the plating bath is highly desirable for both economic and environmental reasons.

U.S. Pat. No. 3,045,334 to Berzin discloses a plating bath comprising nickel sulfate, ethylene diamine, sodium hydroxide, and sodium borohydride to produce a nickel-boron alloy by an electroless procedure. Berzin substitutes cobalt chloride for nickel sulfate to produce a cobalt-boron alloy. Berzin adds a sequestering agent to the bath to prevent precipitation of insoluble metal hydroxides or basic salts. The sequestering agent comprises amines or ammonia.

U.S. Pat. No. 3,297,418, to Firestone, et al, discloses electrolytic deposition of a Ni-Co-Fe alloy. The Firestone et al process uses an acidic bath comprising nickel, cobalt, and iron sulfates, soluble saccharin, sodium lauryl sulfate, sodium chloride, and boric acid. Deposition occurred at low temperatures (20° C.) in the presence of a magnetic field to produce a magnetic film.

U.S. Pat. No. 3,533,922, to Simienko et al discloses electrolytic deposition of a nickel-cobalt-iron alloy on a substrate. Simienko discloses an acidic plating bath comprising nickel and cobalt sulfates, nickel chloride, and ferrous ammonium sulfate. Additives are placed in the bath to control various parameters of the bath and plating process: potassium chloride is added to control magnetic hysteresis characteristics of the film; saccharin is added to control the uniformity of the coating, and boric acid is added as a buffer. As in the Firestone, et al patent, Simienko plates the substrate under a magnetic field to produce a ferromagnetic alloy.

U.S. Pat. No. 4,036,709 to Harbulak discloses electrolytic plating of binary and ternary alloys of nickel, cobalt, and iron. As in the prior patents, the Harbulak patent discloses a bath comprising combinations of nickel, cobalt, and iron salts with boric acid.

U.S. Pat. No. 4,833,041 to McComas discloses depositing on a substrate a quaternary alloy of nickel, cobalt, thallium and boron. The deposition is preferably electroless, but may be electrolytic, using a nickel anode and the substrate as the cathode, and using a fifty amp per square foot DC current. The electroless coatings comprise hard, amorphous nodular deposits of metal alloy in a somewhat softer metal alloy matrix. The mass composition of the coating has a ratio of nickel to cobalt of from about 45:1 to 4:1, the preferred compositions having a ratio of at least 5:1. The coating is heterogeneous in thickness cross-section, having higher cobalt concentrations at the interface of the coating and substrate. With heat treatment at 375° F. to 750° F., the nodules showed crystalline domains of metal borides dispersed in the amorphous metal alloy matrix. The heat-treated coatings are reported to have Knoop hardness values between about 1230 and 1300.

None of these prior patents discloses the production of a ternary alloy of nickel, cobalt, and boron or a plating bath which produces such an alloy. None uses a pulsed square wave current to control the plating process or a solid catalyst to promote epitaxial deposition of a Ni-Co-B alloy on a substrate. None of the systems disclose bonding the alloy to the substrate.

SUMMARY OF THE INVENTION

One of the objects of the present invention is to provide a new and improved metal alloy which is dense, hard, ductile and highly reflective, as deposited.

Another object is to provide such a metal alloy which is also resistant to heat, corrosion, and wear.

Another object is to provide such a metal alloy which has particular utility for coating surfaces, and which, because of its many superior physical and chemical properties, can be advantageously substituted for chrome, hard chrome, nickel-chrome and nickel-palladium coatings, as well as for other highly reflective and corrosion resistant products, such as laser mirrors.

Another object is to provide an improved laser mirror.

Another object is to provide such a metal alloy which can be quickly and easily deposited as a crystalline coating by electrodeposition on a suitable substrate, and which bonds to the substrate at the interface between the alloy and substrate.

Another object is to provide a method of electrodepositing the aforementioned metal alloy which causes the alloy to diffuse into the surface of a substrate and chemically bond as by a polar-covalent bond to the substrate at the interface between the alloy and the substrate.

Another object is to provide such a metal alloy and method which, when applied to suitable substrates of different configuration, form various implements with desired physical and chemical properties.

Another object is to provide a new and improved plating process which reduces or eliminates the production of sludge or residue during the plating procedure.

Another object is to provide a new and improved plating bath which has unlimited life, subject to replacement of certain metallic ions.

Another object is to provide a new and improved electrodeposition method for producing the aforementioned metal alloy.

These and other objects will become apparent to those skilled in the art in light of the following disclosure and accompanying drawings.

In accordance with one aspect of this invention, generally stated, there is provided a novel ternary nickel-cobalt-boron alloy containing, by weight, approximately 49–82.5% nickel, 15.5–49% cobalt, and 1–5% boron. Preferably, the ratio of nickel to cobalt in the composition is between about 1:1 and 4:1, most preferably between about 1:1 and 3:1. The preferred compositions consist, at their exposed surface, of about 49–74% nickel, about 24–49% cobalt, and about 1.9–2.5% boron.

Both physical and chemical analyses of the epitaxial electrolytic deposition of the preferred alloys reveal a homogeneous crystalline structure composed of nickel-cobalt boride crystals in a nickel-cobalt lattice or matrix. The crystals appear to consist essentially of 50–75% $Ni_2B$ and 25–50% $Co_2B$. The lattice appears to be formed of an alloy of nickel and cobalt, the ratio of nickel to cobalt being determined by the bulk composition of the coating.

The alloy formed is brilliant in appearance, as deposited, and thus need not be polished. Its hardness, as deposited, is comparable to that of hard chromium and rhodium, and when heat treated the coating far surpasses them. It nonetheless retains sufficient ductility to be highly useful in applications requiring this characteristic. It is highly resistant to heat, corrosion, and wear as deposited. It thus may be exposed to high heat corrosion conditions or to rubbing contact with another surface under unusual wearing and bearing pressure. Its combination of density, brilliance, hardness, and resistance to heat, corrosion, and wear, as deposited, are unsurpassed.

The alloy is epitaxially deposited on a substrate and structurally diffuses into and bonds by a polar-covalent bond to the substrate. The substrate is, for example, a metal such as stainless steel, brass, Inconel-601, titanium, aluminum, tin, zinc, platinum, palladium, silver, tungsten, alloys or superalloys, or a non-metallic substance, such as glass, ceramic, or plastic, sensitized as with stannous chloride and coated as with palladium. This bonding allows the substrate plated with the alloy to be formed into a durable implement.

The preferred alloy as deposited has a hardness value of between 940 and 1158, as measured with a Vickers Hardness Measuring Device with a 100 gm weight. These values are comparable to that hard chromium. By heat treatment the hardness value can be increased to 1360.

In a preferred process, the alloy is deposited by electrodeposition on the substrate by preparing a bath having, per liter of bath, 1.25–1.31 moles nickel salt, 0.09–0.125 moles cobalt salt, approximately 0.5 moles boric acid, and approximately 0.0125 equivalents of an amino-borane; placing a catalyst, which is chosen from the group consisting of the elements in Group VIII of the Periodic Table, except nickel, in the bath; placing two anodes in the bath and placing a cathode in the bath, the cathode being the substrate; and passing a pulsed square wave current through the bath. The catalyst is preferably palladium. The pulse square wave current has an average current density in the range of 0.018–0.076 amps per square centimeter. The pulse current preferably is at a frequency of about 1000 Hz and an approximately 30% duty cycle. Other duty cycles may be used, however a 50% duty cycle or less is preferred and 30% is most preferred. The bath is air and pump agitated and carbon filtered throughout the plating process.

Preferably, the cobalt salt comprises cobalt sulfate, and the nickel salts comprise nickel chloride and nickel sulfate. The bath includes approximately 0.25–0.31 mole nickel chloride per liter of solution, approximately 0.75–1.1 mole nickel sulfate per liter of solution, approximately 0.0625–0.125 mole cobalt chloride, and approximately 0.0125 mole amino-borane. The amino-borane is preferably dimethylamino-borane complex.

The bath is prepared by heating the appropriate amount of water to approximately 150° F.; dissolving the Nickel sulfate in the water; dissolving nickel chloride and cobalt sulfate in the water, adding boric acid to the solution; cooling the solution to 100°–110°F. and when it passes through a 325 mesh sieve adding a dissolved amino-borane to the solution; heating the solution to approximately 150° F.; adjusting the pH of the solution to 3.8–4.0; and adding wetting and stress relief agents.

The substrate is pretreated prior to plating by washing the substrate with an anionic solution and washing it with alcohol. The surface of the substrate to be plated is activated to promote bonding of the alloy to the substrate. Activating the substrate includes anodically cleaning the substrate by immersing it in an alkaline solution of $NaOH$, $Na_2CO_3$, $NaSiO_3$, and $Na_5P_3O_{10}$ and passing a 0.08 amp/cm$^2$ negative current through the solution. The substrate is then washed in an acid bath comprising 1% $H_2SO_4$ and 0.1% HCl. It is then immersed in a solution of HCl and $NiCl_2$ and anodically and cathodically cleaned by passing a negative and then a positive current through the solution. The bath is maintained at a slightly elevated temperature, preferably at a temperature of about 150° F. The bath is provided with a double system of agitation, one outside of the cathodic cell which benefits the oxidation reaction, and the other inside the cathodic cell which benefits the reduction reaction. Preferably, a carbon filter and pump-driven circulation system is provided in the anodic cell, and an air agitation system in the cathodic cell.

The properties of the alloy produced by the present invention permit it to be used as a substrate for abrasives such as diamonds used in high-temperature cutting tools. They also permit it to form superior mirrors, such as a mirror used in a pumped laser. In accordance with another aspect of the invention, the laser mirror may be uniquely formed with concavities.

DESCRIPTION OF THE PREFERRED EMBODIMENT

Deposition of the alloy on the substrate is preferably accomplished by electrolysis. A pair of bagged anodes made of electrolytic nickel and a cathode, the substrate to be coated, are connected to a power source and are immersed into the plating bath to pass a current therethrough. The power source produces a pulsed square wave current at a frequency of 1000 Hertz and having a 30% duty cycle. The square wave preferably has a $T_{on}$ of 0.3 milliseconds, a $T_{off}$ of 0.7 milliseconds, and an average pulse current density of between 0.018 to 0.076 amps/cm$^2$. By electrolysis, the pulsed current produces $O_2$ at the anodes and $H_2$ at the cathodes when it is on. When it is off, the diffusion layer of gas disperses. The alternate production of $O_2$ and $H_2$ and the disappearance of the diffusion layers prevents the oxidation on the anodes and prevents polarization at the substrate (cathode).

Suitable substrates are those which can be activated on their surface, such as metals composed of iron, steel, stainless steel, nickel, cobalt, chromium, titanium, aluminum, tin, zinc, platinum, copper, brass, silver, and tungsten alloys and superalloys, and various other. Nonmetallic compounds, such as glass, ceramics and plastics may also be used as a substrate if they are sensitized. Sensitizing a non-metallic substrate is commonly performed by electroless plating of a film of tin and palladium on the surface of the tin. This is done, for example, by immersing the compound in a solution of stannous chloride and then immersing it in a solution of a metal salt, the metal being palladium.

Prior to placing the substrate in the plating bath, it is pretreated, washed and activated. The substrate is first pretreated by cleaning first with alcohol, preferably isopropanol, and then cleaning it with an anionic solution. Isopropyl alcohol is preferred for the alcohol wash because it only has three carbons and thus, does not leave a carbon film on the substrate. Using an alcohol having more carbons may result in a carbon film on the substrate.

Figure 1:
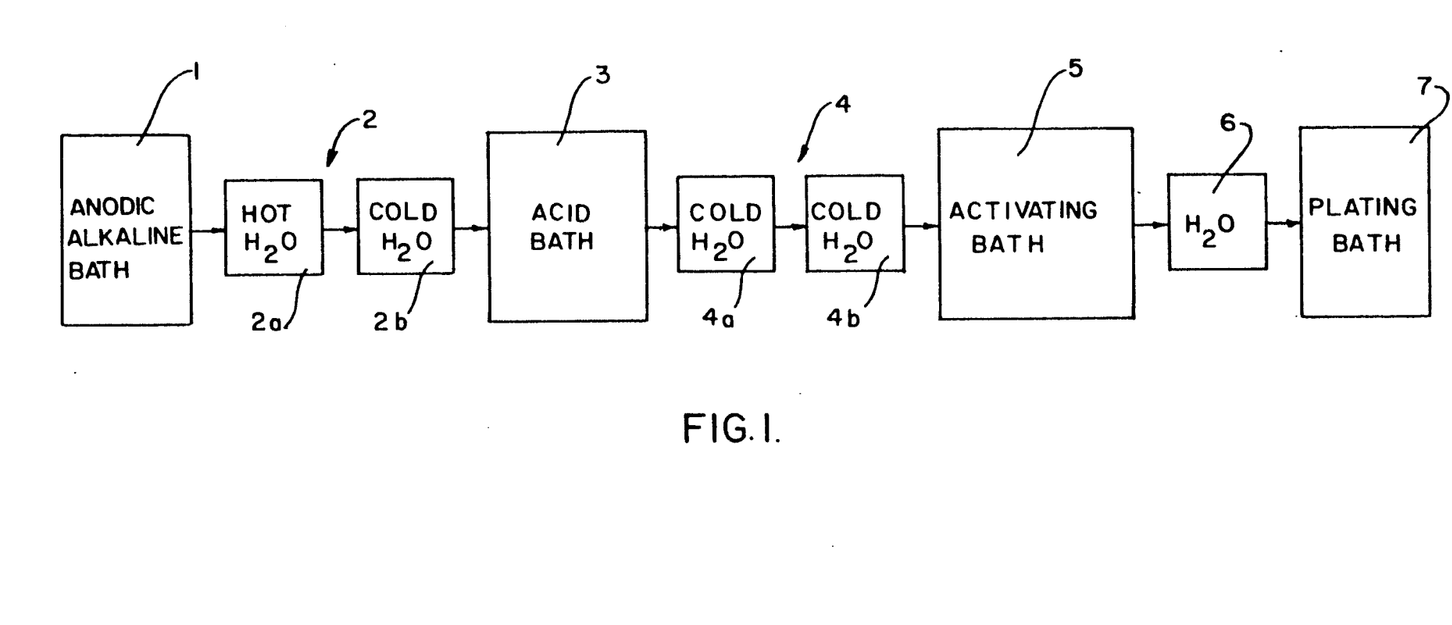
FIG. 1 is a flow chart describing the steps involved in treating a substrate prior to plating.

After pretreatment, the substrate is anodically cleaned, as shown in the FIG. 1 flow chart, in an alkaline solution 1 for two minutes in the presence of a negative current having a density of 0.08 amps/cm$^2$. The solution preferably contains NaOH, $Na_2CO_3$, $NaSiO_3$, and $Na_5P_3O_{10}$. It is then rinsed in hot distilled or deionized water 2a and cold distilled water 2b which removes all the alkalines except the sodium silicate. The silicate gives a protective layer to the substrate. The substrate is then immersed in an acid bath 3 for five minutes. The acid bath contains 1% sulfuric acid and 0.1% hydrochloric acid. The substrate is then rinsed in cold distilled or deionized water 4.

After the alkaline and acid baths, the substrate is activated, both anodically and cathodically, in an activator solution 5 of HCl and NiCl$_2$. It is first anodically activated by passing a negative current through the activator bath for two minutes. This removes the top layer of the substrate. It thus removes the oxides which have formed on the substrate surface. In the same solution, the substrate is cathodically activated, for six minutes, by passing a positive current through the activator bath. Cathodic activation forms a metastable layer of nickel on the substrate. The substrate is then slowly and gently dipped in distilled water 6 and thereafter placed in the plating bath 7 for the plating process.

The washing of the substrate after the alkaline and acid baths preferably is performed in two separate tanks of water, 2a, 2b and 4a, 4b. The use of a double rinse better removes the bath solution. Thus, the prior bath will not contaminate the next bath.

The substrate may be pretreated any time before being placed in the alkaline bath for anodic cleaning. The substrate should, however be wetted before being placed in the alkaline bath. Further, once the substrate is placed into the anodic bath, the substrate should be moved from bath to bath quickly, so that there will always be a protective layer of water on the substrate. This water layer prevents contaminates in the air from adhering to the substrate. Thus, the substrate is clean and free of contaminates before being placed in the plating bath.

One advantage of this cleaning process is that, as just mentioned, the substrate is free of contaminant, such as oxides when placed in the plating bath. Thus, sequestering agents, as are described by Berzin in U.S. Pat. No. 3,045,334, are not needed to prevent precipitation or the formation of sludge in the plating bath.

The plating bath contains nickel and cobalt salts, boric acid, and a amino-borane. The bath preferably includes, per liter of solution:

0.75–1.1 mole nickel sulfate (NiSO.7H$_2$O)
0.250–0.3125 moles nickel chloride (NiCl.6H$_2$O)
0.0625–0.125 moles cobalt sulfate (CoSO.7H$_2$O)
0.500 moles of boric acid (H$_3$BO$_3$) and
0.0125 moles of dimethylamino borane (DMAB) ((CH$_3$)$_2$NH.BH$_3$).

The bath also includes 2 ml of a wetting agent and 0.25 ml of a stress relief agent per liter of solution. The wetting agent, which may be a sulfonate or an alcohol, effectively slows down the rate at which the nickel, cobalt and boron ions reach the substrate. This thereby provides a more uniform deposition of the alloy on the substrate. The stress relief agent prevents hydrogen from being trapped in the alloy and between the alloy and the substrate. If hydrogen were trapped in the alloy, it would become brittle. Thus the stress relief agent aids in producing a ductile alloy.

Figures 2, 3, 3A, 10:
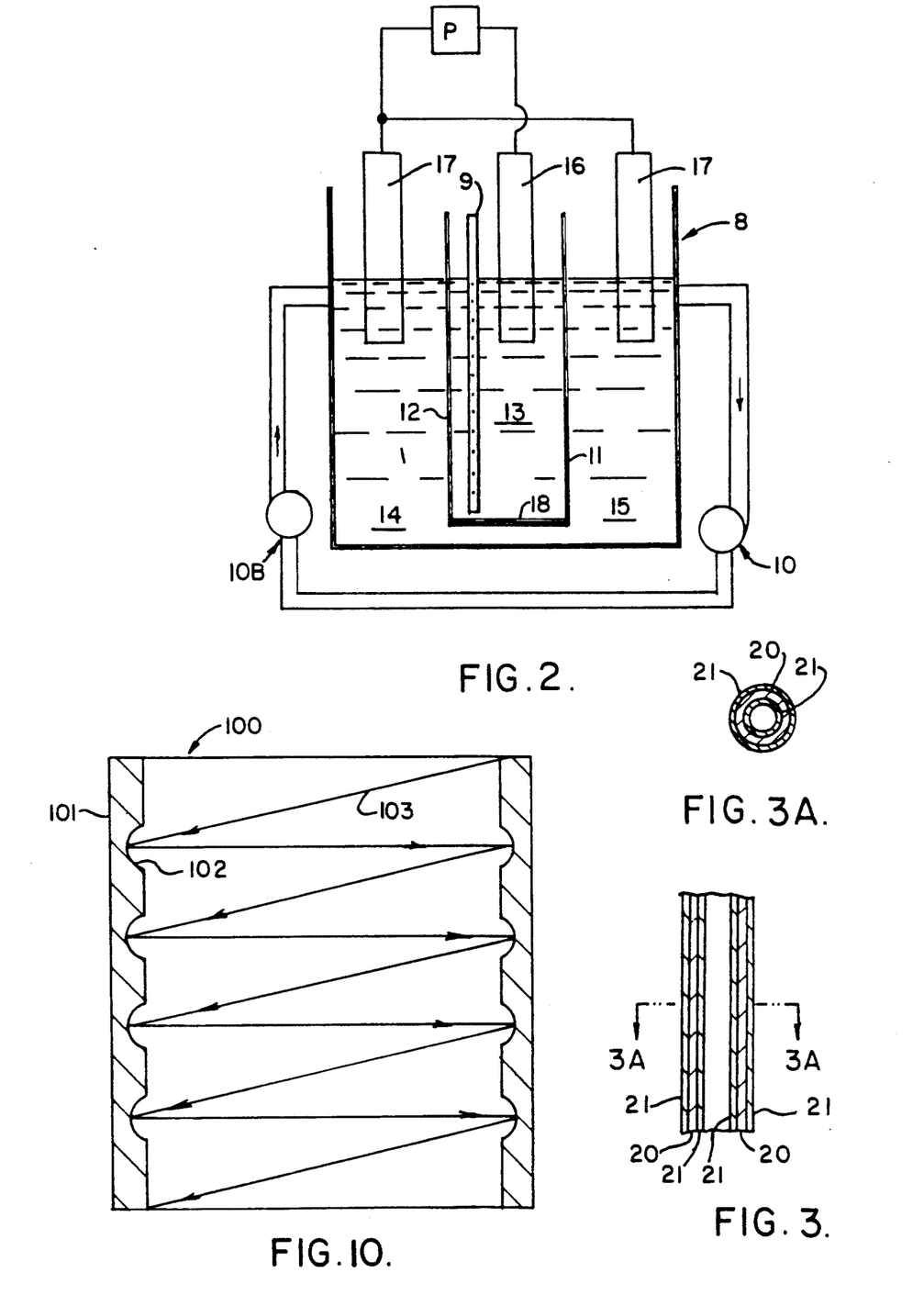
FIG. 2 is a schematic drawing of a tank used for the plating process.
FIG. 3 is a view in cross-section of a cylindrical tube or pipe substrate showing that the plating process will coat both the inner and outer surfaces of the substrate.
FIG. 3A is a cross-sectional view taken through line 3a—3a at FIG. 3
FIG. 10 is a cross-sectional view of a laser chamber.

The bath may be prepared in a 40cm×30cm×30cm tank 8 which is equipped for air agitation 9 and pump filtration 10 and includes an automatic teflon heater, a level control, a pH control, and a monitor to monitor the chemical analysis solution. The tank is divided into three sections by two diaphragms 11 and 12 of microscopically perforated acrylic. The center section provides a cathodic cell 13 and the two outer sections provide anodic cells 14 and 15. The substrate 16, which is used as the cathode, is immersed in the cathodic cell. An electrolytic nickel bar forms an anode 17 and is bagged with polypropylene. One such bar is placed in each anodic cell. The sides of the anodes are preferably adjustable, as by masking, to obtain the proper anode-cathode ratio of approximately 1:1 to 4:1. The anodes are preferably about 7 to 8 inches long for tank 8, which is preferably about 60% to 70% of the length of the anode bars, which are used to connect the anode to the source of power.

Circulation of the bath in the tank is provided by the filtration and air agitation systems. The circulation and agitation helps to keep the anodes clean, benefits the alloy forming reaction by keeping ion concentrations equal in all areas of the tank, and aids in the brilliant appearance of the alloys. A pump 10 continuously pumps the plating bath in the anodic cells through an activated carbon filter 10a to provide the circulation and to remove contaminates and any cobalt or nickel borides which may precipitate out. The air agitation system operates at 0.25 psi to circulate the solution in the cathodic cell.

An aqueous solution containing the proper amount of nickel and cobalt salts, boric acid, and amino-borane is created in the tank. The bath is adjusted to a pH of between 3.8 and 4.0 with sulfuric acid or ammonia hydroxide and is heated to approximately 150° F.±1%. The catalyst 18 is placed in one of the cells, preferably the cathodic cell, formed by the diaphragms. The solution is kept at a constant level to keep the components in equilibrium. The bath is continuously agitated by the filtering and the air agitation systems. This further reduces residue or sludge production if any.

During the plating procedure, the cobalt ions are replenished in accordance with the amount of cobalt ions removed from the solution. The bath has unlimited life if the cobalt that is taken out is replaced. The remaining constituents are equilibrated by periodic analysis. The pulse current breaks down the wetting and stress relief additives in the bath. They must therefore be replenished periodically. The current parameters and working conditions should remain constant, and contaminants eliminated, by known care and purification techniques.

The prepared surface is immersed into the bath to a depth of approximately two inches, with the current on, for coating with the Ni-Co-B alloy. The thickness of the coating is dependant on the surface area of the substrate, the current density and the time of the plating process.

The nickel-cobalt-boron alloy has been found to have remarkable physical and chemical properties, as deposited. It is highly brilliant and reflective, has a hardness in the range of 900–1158 as deposited and 1360 when heat treated, as measured using a Vickers Hardness Measuring Device having a 100 gm weight (VPN 100 gm). It is also highly resistant to heat, corrosion, and wear as deposited. The coating is not porous. Its corrosion resistant qualities have been found to be on par with rhodium, and surpass the qualities of chromium, chromium-molybdenum and lead-cadmium alloys produced by electrolysis or sintering, as well as with electroless nickel-boron or nickel-cobalt-thallium-boron alloys. The brilliant appearance of nickel-cobalt-boron alloy can compete with the appearance of chrome or rhodium. Its hardness is greater than that of hard chrome. Because of its high melting point (1291° C.) and its excellent resistance to wear and corrosion, this novel alloy has particular utility for coating surfaces of articles which, under normal use, are subject to highly abrasive rubbing or sliding conditions under high pressure and temperature. This alloy can be advantageously substituted for chrome, hard chrome, nickel-chrome, and nickel-palladium coatings.

The alloy has been found to structurally diffuse and integrate into the substrate along an interface between the alloy and substrate. A polar-covalent (chemical) bond is formed at the interface to bond the alloy to the substrate. The catalyst provides the energy to produce the polar-covalent bond, without it being used up. Thus, the catalyst need not be replaced, as long as it is cleaned periodically to remove any impurities. The bonding is also enhanced by the presence of the metastable layer of nickel formed on the substrate during activation.

All analyses of the metal alloy coating were performed with a Joel Scanning Electron Microscope, model JSM-35 CF, with a computerized Eadox Ortec System 5000. X-ray analysis revealed that the deposit of nickel-cobalt-boron is a homogeneous crystalline structure comprising nickel and cobalt borides being contained in a matrix of nickel-cobalt.

The plating may be coated on implements and products of various shapes and sizes, such as the cylindrical tube or pipe 20 (see FIG. 3) with the plating, 21 coating the inner and outer surfaces of the tube 20. Reference is also made to the discussion in EXAMPLE 2 explaining the specifics of the process as applied to the tube or pipe 20. It will also be appreciated that various other implements and products may be coated with the plating alloy of the present invention.

Figure 4:
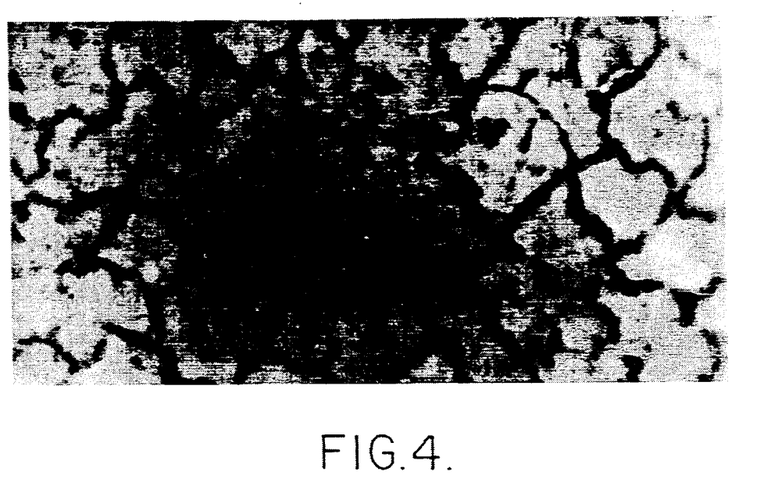
FIG. 4 is an electron photomicrograph, enlarged 1000×, of a coating of an alloy in accordance with Example 1 of the present invention on stainless steel, after treatment with NaOH for 60 seconds and acid etching for 6 seconds in 85% $H_2O$, 10% HF and 5% $HNO_3$.

Because of its high reflectivity as deposited (approximately 94.5%) and its resistance to acid corrosion, the Ni-Co-B alloy may be suitably used as a reflective surface in a laser 100. A preferred embodiment of a laser mirror 101 (FIG. 4) has a plurality of small dimples 102 thereon. In planar mirrors the radiation reflects back upon itself. However, the dimples 101 of laser mirror 100 prevent this, as can be seen by arrows 103 indicating the flow of reflected radiation at an angle from each dimple. This allows for an increase in the efficiency of the stimulated radiation. In producing mirror 101, a substrate which is predimpled and has the desired shape is coated with the alloy as described above.

The following examples disclose details of the bath composition, process condition and results of analyses which give the representative properties of the alloy of the present invention. The following examples are illustrative and not to be taken as limiting.

EXAMPLE 1

The plating solution was prepared by heating thirty-two liters of distilled water to 150°F. Eight moles of $NiCl.6H_2O$ were dissolved in the hot distilled water. Thirty-two moles of $NiSO.7H_2O$ and four moles of $CoSO.7H_2O$ were added to the $NiCl_2$. When the entropy of the system reach an optimum point (the solution is well mixed), sixteen moles of $H_3BO_3$ were added and dissolved. When the solution passed easily through a 325 mesh sieve, it was cooled to approximately 100° F.–110° F. 0.4 moles of DMAB $((CH_3)_2NH.BH_3)$ were then added to the bath. The DMAB is previously dissolved in distilled water or cool solution of the plating bath. After mixing was complete, the catalyst, in a ratio 1 $cm^2$/liter (32 $cm^2$) was placed in the bottom of the cathodic cell. The temperature of the bath was elevated to, and held constant at 150° F.±1%. The pH of the solution was adjusted to 3.8 to 4.0 using $H_2SO_4$. Lastly, 2 ml/liter of wetting agent and 0.25 ml/liter of stress relief agent were added.

A piece of stainless steel 305, 30 cm long by 0.159 cm in diameter, was pretreated as indicated above. It was immersed for two minutes in an anodic alkaline bath without sodium cyanide using a regular DC current at 0.08 amps/cm². After rinsing in hot and cold distilled water, it was activated anodically and cathodically as described above. After being activated, the substrate was immersed in the tank's cathodic cell. The power source was set to have a frequency of 1000 Hertz with a $T_{on}$ of 0.3 milliseconds and a $T_{off}$ of 0.7 milliseconds, an average current density of 0.03749 amps/cm², an average current of 0.53 amps, and a total current of 10.3 amps/minute.

After 19 minutes, 30 seconds, the stainless steel bar was removed from the bath. After rinsing, the bar was measured with a Sylvac Fowler Ultra-Cal II Digital Micrometer connected to a computer. It was found to have a diameter of 0.162 centimeters. Thus, it had a coating of 0.003 cm. The bar was measured at two points, A and B, two centimeters from each end of the bar, a point C, at the center of the bar, and at points in the center of the lines A—C and B—C. No variation in the thickness of the coating was observed. The nickel-boron-cobalt alloy was brilliant and reflective in appearance, and smooth and sliding to the touch. Electron microscopic examination of the alloy surface revealed a non-porous crystalline structure of the alloy. (FIG. 4) Scanning electron microscopy (SEM) examination revealed that the composition of the crystalline deposit at the outermost surface was 55.05% $Ni_2B$ and 44.95% $Co_2B$. Atomic absorption revealed the coating was comprised of 53.8% Ni, 43.97% Co, and 2.19% B at the outermost crystalline surface.

The 30 cm coated bar was bent into a 180° semicircle and left in that position for 24 hours. Examination with an optical microscope showed no crack or fracture in the middle of the bend, showing that the alloy is ductile.

The surface of the coated bar was found to have a hardness of 1158 using a Vickers Hardness Measuring Device having a 100 gm weight (VPN 100 g). This is greater than the hardness of commercial grade nickel or nickel-boron alloy formed in an electroless system and is advantageously comparable with hard chrome.

The bar was tested for corrosion resistance in a fog cell chamber for 80 hours. A commercially available bar of chromium-molybdenum alloy was used as a comparison. The chromium-molybdenum alloy developed superficial perturbations and lost brilliance. The nickel-cobalt-boron alloy coated bar, however, showed no superficial perturbations and maintained its original brilliance and smoothness. This showed that the Ni-Co-B alloy is highly resistant to corrosive conditions.

The nickel-cobalt-boron coated bar was compared against a lead-cadmium alloy coated bar for adhesion of the alloy coating to the substrate by dry-cutting the two bars transversely with a diamond cutting wheel. The nickel-cobalt-boron alloy was found to have excellent adhesion. The high temperature produced by the dry cutting did not change any physical properties, including its appearance. The other bar showed fair adhesion but the level of hardness dropped, showing mechanical properties of lead-cadmium alloy change with temperature.

A piece of the nickel-cobalt-boron alloy coated bar, approximately 30 mm long was connected to a Moto-Tool, an abrading device produced by the Dremel division of Emerson Electric Co., operating at 28,000 rpm to test the alloy for resistance to wearing conditions. The nickel-cobalt-boron alloy coated bar was rotated against the edge of a piece of glass for 300 seconds. A drop of water was used as lubrication. The alloy was optically examined with a microscope. Its surface showed no marks or damages, and its appearance remained brilliant and smooth. Upon measuring the bar, no change in the thickness of the alloy coating was found, showing that the nickel-cobalt-boron alloy is highly resistant to wear.

A piece of the coated bar was tested for adhesion, abrasion, and wear resistance using a Leco Device. A highly abrasive disk was rotated against the alloy for 5 seconds at 219 rpm. The coating was found not to have been damaged by the abrasive disk.

A small piece of the coated rod was placed in a Dietart Furnace with Vari Temp, a refractory chamber and a porcelain crucible. The alloy was found to have a melting point of 1291° C. ±27° C.

EXAMPLE 2

The procedures of Example 1 were followed to deposit the nickel-cobalt-boron alloy on a brass pipe 20 2.6360 cm long, having an inner diameter of 1.195 cm, an outer diameter of 1.275 cm, and a wall thickness of 0.080 cm. The plating bath was prepared in the same manner as the bath of example 1, however, it had 9 moles of $NiCl.6H_2O$ and 3 moles of $CoSO.7H_2O$. The power source was altered to have an average current of 0.74 amps and a total current of 14.41 amps/min. The remaining power source parameters were the same as in Example 1. The brass pipe was immersed in the bath for 19 minutes, 28 seconds. It was then rinsed with water and dried.

The cylinder was measured, as before, and was found to have an 0.003 cm coating 21 of the alloy on both the inner and outer surfaces of the cylinder (i.e. the wall thickness increased by 0.006 cm.). The fact that the coating on both the inner and outer surfaces of the cylinder were of the same thickness shows that the plating bath has a high throwing power.

Figure 5:
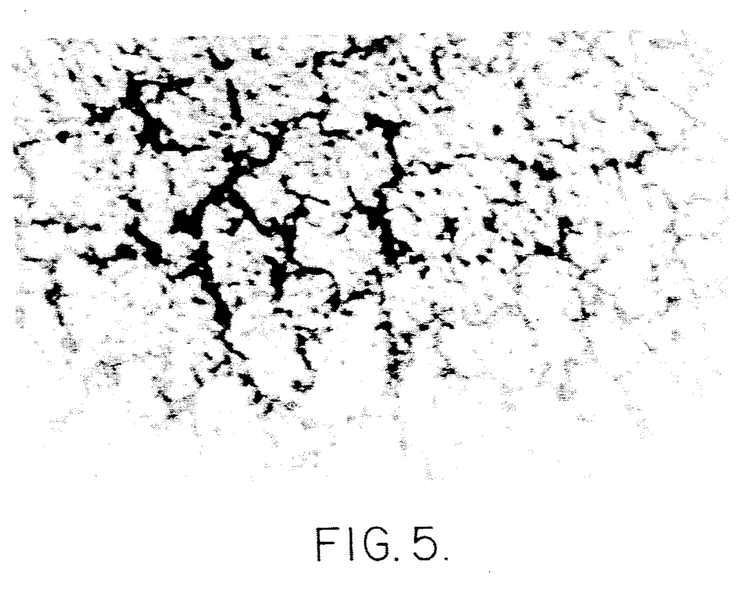
FIG. 5 is an electron photomicrograph, enlarged 1000×, of a coating of an alloy in accordance with Example 2 of the present invention on brass, after treatment with alkali and acid etching.

Again the alloy felt slippery and smooth to the touch and appeared brilliant. X-ray examination showed that the outer diameter of the piece had the same structure as in Example 1. (FIG. 5) SEM examination revealed that the crystalline deposit had a composition of about 32.13% $Co_2B$ and 67.87% $Ni_2B$ at the surface. By atomic absorption, it was determined that the alloy was 66.38% Ni, 31.43% Co, and 2.19% B at the outermost crystalline surface. The hardness of the alloy was found to be 1086 VPN 100 g.

EXAMPLE 3

The procedure of Example 1 was followed to deposit the nickel-cobalt-boron alloy on a strip of copper 2.6 cm wide, 16 cm long and 1.7 mm thick. The bath was prepared in accordance with the procedures of Example 1, but was altered to have 10 moles $NiCl.6H_2O$ and 2 moles $CoSO.7H_2O$. The power source was altered to have an average current of 3.1 amps and a total current of 81.12 amps/minute. The remaining power source parameters remained the same as in Example 1. The copper strip was immersed in the plating bath for 26 minutes, 10 seconds. It was then removed from the solution and rinsed with water.

The quality of the coated copper strip appeared the same as in Examples 1 and 2. The alloy coated copper strip did not lose its flexibility when bent in both directions to form a 180° semicircle. Optical, microscopic examination of the bent bar revealed no cracks, fractures, or imperfections, thereby demonstrating the alloy's ductile character. The hardness was found to be 940 VPN 100 g.

One end of the coated strip was polished, cleaned with NaOH at room temperature and etched with a solution of 85% $H_2O$, 10% HF, and 5% $HNO_3$ to prepare it for metallurgical examination. Electron microscopic examination showed that the nickel-cobalt-boron alloy was diffused into the copper matrix at its two interfaces.

Figure 6:
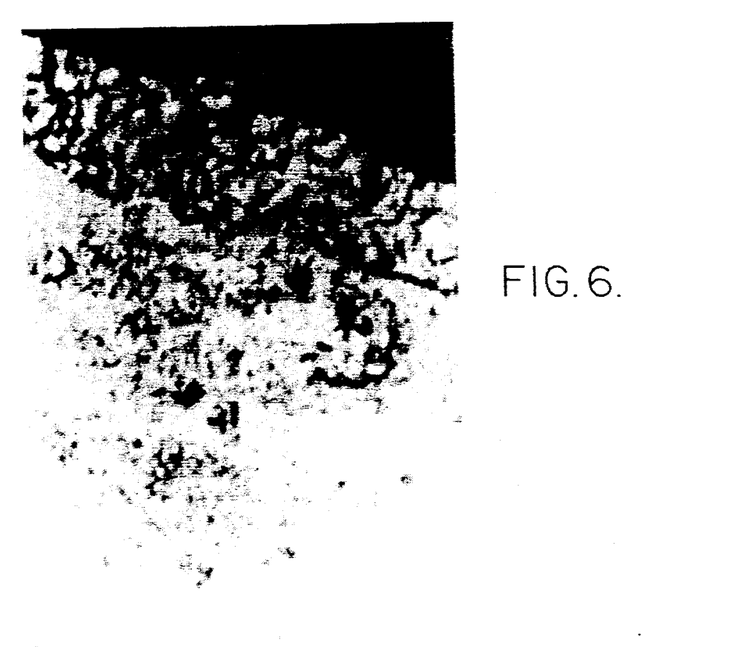
FIG. 6 is an electron photomicrograph of the alloy enlarged 400×, plated on copper after treatment with alkali and acid etching and shows that the alloy is homogeneous through its thickness, the alloy being made in accordance with Example 3.

SEM examination revealed that the crystalline deposit on the copper strip had a composition of 26.48% $Co_2B$ and 73.52% $Ni_2B$. (FIG. 6) Atomic absorption revealed the composition of the alloy in terms of nickel, cobalt and boron was 71.9% Ni, 25.9% Co, and 2.2% B at the outermost crystalline surface.

The alloy's resistance to acid corrosion was tested by covering the plated strip for 120 seconds with various acids. It was covered with 50% $HNO_3$ solution; concentrated HCl; concentrated $H_2SO_4$; concentrated HF; concentrated $H_3PO_4$; concentrated $HClO_4$, and aqua regia (25% $HNO_3$ and 75% HCl). After testing with the acids, the alloy coating remained brilliant, demonstrating the alloy's high resistance to acid corrosion.

A Guild Reflectometer with a photoelectric cell and a coated sphere of magnesium oxide was used to measure the reflectivity of a piece of the strip after it was polished. The polished alloy was found to have a reflectivity of 94.5%. This is better than rhodium or chromium, which have reflectivity values of 92.31% and 85.71%, respectively.

It has been found that by increasing the current density for example, up to 0.076 amps/$cm^2$, similar reflectivity values can be obtained without polishing. The reflectivity of the alloy is believed to be due to the orientation of the boride crystals in the 1-1-1 plane.

EXAMPLE 4

The procedure of Example 1 was followed to deposit the nickel-cobalt-boron alloy on twenty tips of TiAl6V4, an alloy made of titanium (90%), aluminum (6%) and vanadium (4%) and commonly used for turbine blades. The exposed surface of each tip was 1.02 cm long and 0.34 cm wide. Each piece also included a 0.010 inch lip down its sides. The rest of the surface was isolated using a special mask. The tips were attached to a suitable device for immersion in the plating solution.

The bath of Example 1 was used. The power source was set to have an average current of 0.26 amps and a total current of 3.3 amps/minute. The remaining power source parameters were the same as in Example 1.

Before immersion of the cathode into the nickel-cobalt-boron solution, the tips were pretreated as indicated above, and their exposed surfaces were activated with a solution of $I_2$ and methanol. When the methanol was evaporated, the device was immersed into the nickel-cobalt-boron solution. After 13 minutes the device was washed with water.

Figure 7:
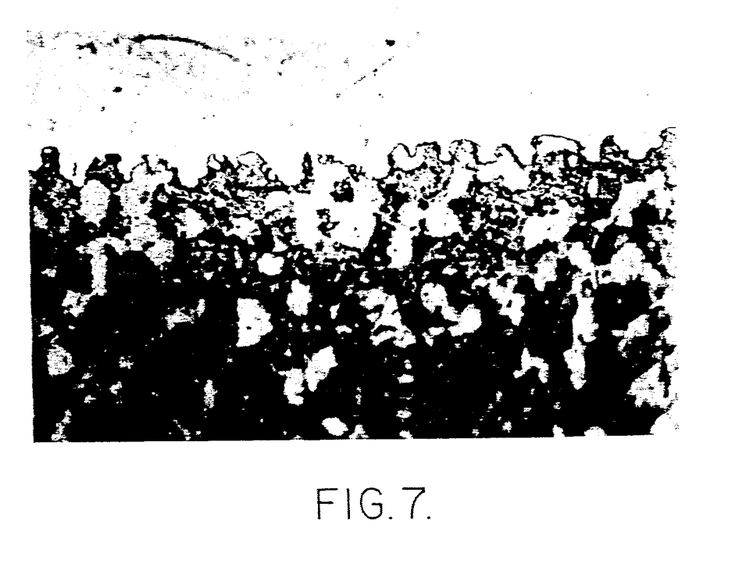
FIGS. 7 and 7a are cross-sectional views enlarged 500× of the alloy plated on a titanium alloy substrate after treatment with alkali and acid etching showing that the alloy and substrate diffused into each other and that the alloy is atomically bonded to the substrate.
Figure 7A:
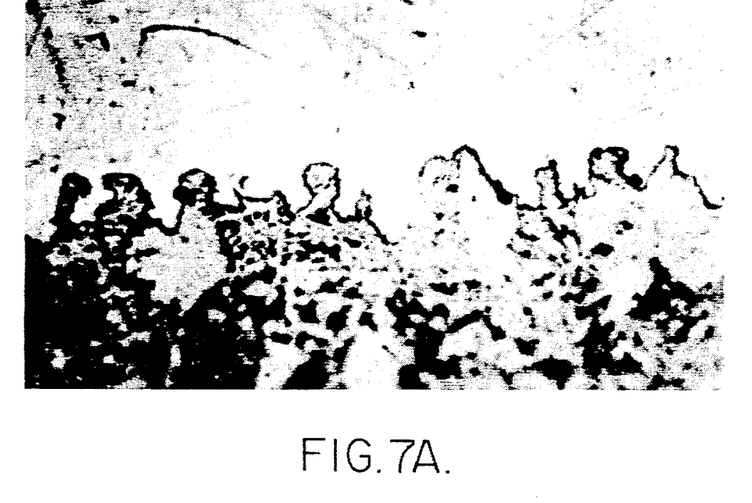

One of the tips was cut and prepared for metallurgic examination. Electron microscopic examination revealed that the nickel-cobalt-boron alloy diffused into the TiAl6V4 at the interface. The remaining 19 tips were placed in a furnace for 90 minutes at 675° in an Argon atmosphere at 1 Torr of pressure. After cooling, the tips were washed in NaOH and rinsed with distilled water. A second tip was cut and prepared for metallurgic examination. X-ray examination showed diffusion of the nickel-cobalt-boron alloy into the TiAl6V4 matrix. In both the heat-treated and untreated tips, a polar-covalent bond between the alloy and substrate was found at the interface. (FIGS. 7 and 7A) There was found to be no difference between diffusion of the alloy into the substrate of the heat treated tip as compared to the tip which was not heat treated, demonstrating the alloy's resistance to high heat conditions. The hardness of the heat treated alloy was found to be 1360 VPN 100 g.

EXAMPLE 5

Using the same procedures as in Examples 1 and 4, the nickel-cobalt-boron alloy was deposited on 30 small pieces of Inconel-01 (a nickel-based super alloy) having dimensions of 2.5 cm×1.0 cm×3 mm. The bath of Example 1 was used. The power source was set to have an average current of 0.34 amps and a total current of 6.58 amps/minute. The remaining power source parameters was the same as in examples 1 and 4.

Each one of the Inconel-601 pieces was masked and put into a suitable device for immersion into the plating bath. After pretreatment, the exposed surfaces (only the edges), were activated anodically and cathodically in an acid solution. After rinsing, the pieces were immersed in the nickel-cobalt-boron plating solution for 19 minutes, 22 seconds. The device containing the Inconel-601 pieces was then removed from the bath, and the pieces of Inconel-601 were washed with NaOH, rinsed with cold/hot water, and dried.

Figure 8:
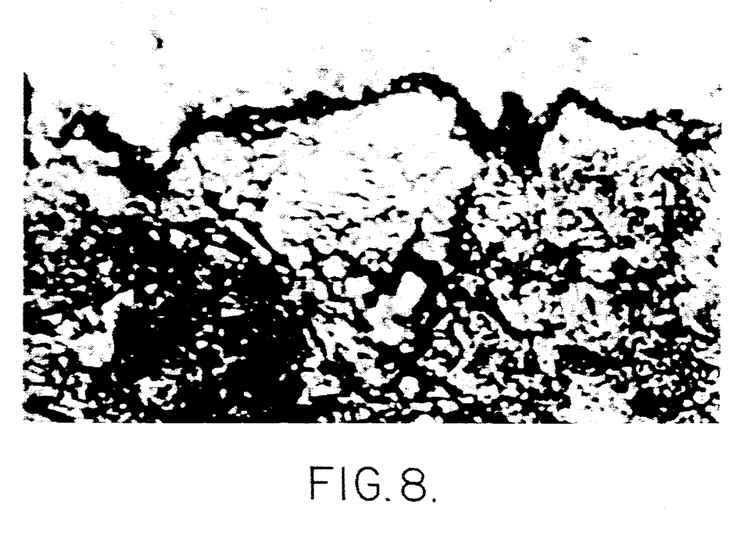
FIG. 8 is an electron photomicrograph, enlarged 600×, of a coating of an alloy in accordance with Example 5 of the present invention on Inconel-601, after treatment with alkali and acid etching.

The Inconel-01 pieces were placed in a furnace for 90 minutes at 930° F. at one Torr of pressure in an argon atmosphere. After cooling, one piece was cut and prepared for metallurgical examination. X-ray examination revealed that the diffusion of the nickel-cobalt-boron alloy into the Inconel-01 occurred at the interface. (FIG. 8) SEM examination showed a composition of 55.05% $Ni_2B$ and 44.95% $Co_2B$. Atomic absorption showed the alloy had an elemental composition of 53.84% Ni, 43.97% Co, and 2.19% B at the outermost surface.

EXAMPLE 6

The procedures of Example 1 was followed to deposit the nickel-cobalt-boron alloy on a flat piece of commercial titanium, having an exposed surface of 1.5 cm×4 cm. The nickel-cobalt-boron bath of Example 1 was used. The power source was set to have an average current of 0.45 amps and a total current of 7.31 amps/minute.

The titanium substrate was pretreated but no activated to prevent the alloy from bonding to the substrate. The cathode was then immersed in the solution. After 16 minutes, 15 seconds, the titanium cathode was removed from the plating bath, washed with a 10% NaOH solution, and rinsed with distilled water.

Using this process, two small pieces of nickel-cobalt-boron alloy foil, measuring 0.00125 cm in thickness, were obtained. The weight of one piece of the foil was determined to be 0.0654 g, resulting in a specific weight of 8.72 g/$cm^3$. This is very close to the alloy's theoretical density of 8.7432 g/$cm^3$.

Figure 9:
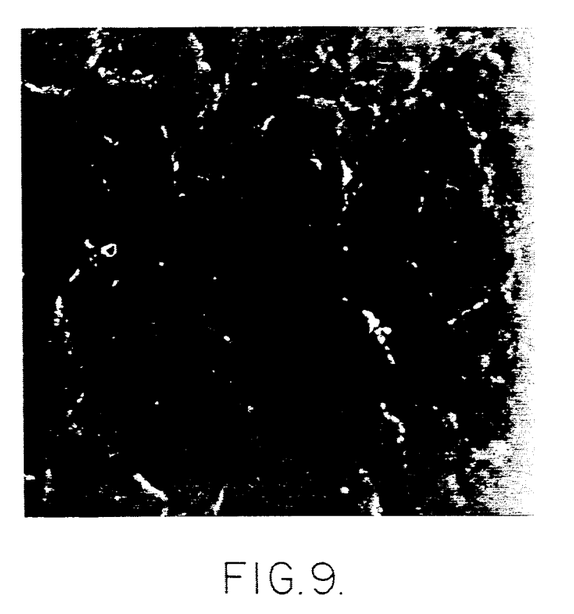
FIGS. 9 and 9A are photomicrographs enlarged 75× and 2000× respectively of NiCoB foil after treatment with alkali made in accordance with example 6.
Figure 9A:
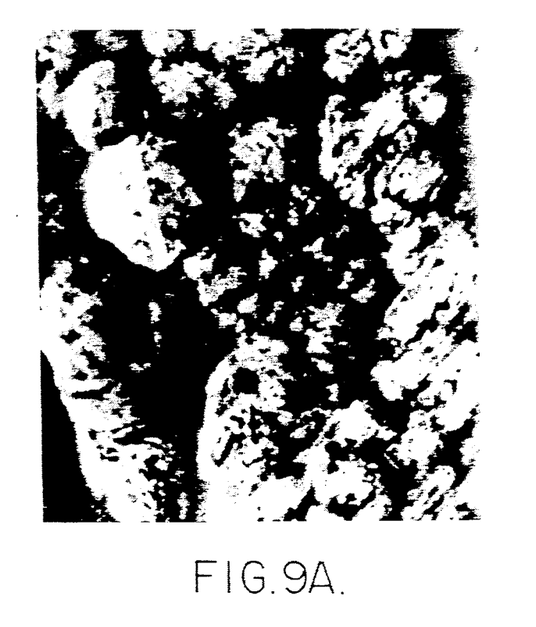

X-ray examination revealed no porosity or imperfection in the structure of the two pieces, despite their thinness. The two pieces were, however, found to reflect or mirror the surface configuration of the dummy substrate of titanium. (FIGS. 9 and 9A)

SEM examination showed a composition on both sides to be 55.05% $Ni_2B$ and 44.95% $Co_2B$.

The above examples are set forth for illustrative purposes only and are not to be construed as limiting.

From the foregoing discussion, it will be appreciated that the present invention provides a novel and unique alloy, implement, plating solution and method for making same which provides the aforementioned advantageous results and achieves the objects and features of this invention.

Various changes can be made in the above compositions, products and method, as well as in the disclosed ranges of the present invention, without departing from the scope of the appended claims. For example, the tank 8 can be scaled up in size. Further, the same alloy may be made by chemical plasma deposition.

I claim:

1. A method of depositing a ternary alloy consisting essentially of nickel, cobalt, and boron on a substrate, the method comprising:
   preparing a plating bath of nickel, cobalt and boron ions;
   placing a catalyst in the plating bath, the catalyst being selected from the group consisting of the elements of group VIII of the periodic Table, except nickel;
   electrolytically depositing the nickel, cobalt, and boron ions forming a coating of the ternary alloy on the substrate.

2. The method of claim 1, further including continuously agitating and filtering the plating bath.

3. The method of claim 2, wherein the step of agitating the plating bath comprises agitating a cathodic area with air and agitating an anodic area by pumping action.

4. The method of claim 3, wherein the step of preparing the plating bath comprises mixing, per liter of plating bath, 1.00–1.41 moles nickel salt, 0.06–0.125 moles cobalt salt, approximately 0.5 mole boric acid, and approximately 0.0125 mole of an amino-borane.

5. The method of claim 4, wherein the cobalt salt comprises cobalt sulfate, and the nickel salts comprise nickel chloride and nickel sulfate, the bath including, per liter of bath, approximately 0.25–0.31 mole nickel chloride approximately 0.75–1.1 moles nickel sulfate, and 0.06–0.125 mole cobalt sulfate.

6. The method of claim 5, wherein the amino-borane comprises dimethylamino-borane.

7. The method of claim 5, wherein said step of preparing the bath comprises heating an appropriate amount of water to approximately 150° F.; dissolving the nickel sulfate in the water; dissolving the nickel chloride and cobalt sulfate in the water, adding the boric acid to the bath; cooling the bath to 100°–110° F. when it can pass through a 325 mesh sieve; adding a dissolved amino-borane to the bath; heating the bath to approximately 150° F.; adjusting the pH of the bath to 3.8–4; and adding wetting and stress relief agents to the bath.

8. The method of claim 1, wherein the step of electrolytically depositing the nickel, cobalt, and boron on the substrate includes passing a pulse square wave current through the plating bath while the substrate is immersed in the bath, the current having an average current density of between 0.018–0.076 amps/cm$^2$.

9. An electroplating bath for coating a substrate, said bath comprising, per liter of bath, 1.00–1.41 moles nickel salt, 0.06–0.125 moles cobalt salt, approximately 0.5 mole boric acid, and approximately 0.0125 mole of an amino-borane and said coating is a ternary alloy coating consisting essentially of nickel, cobalt and boron.

10. The electroplating bath of claim 9, wherein said bath includes, per liter of bath, 1.0 mol nickel sulfate, 0.250–0.31 mole nickel chloride, 0.06–0.0125 mol cobalt sulfate, 0.5 mole boric acid, 0.125 mol amino-borane.

11. The electroplating bath of claim 10, wherein said amino-borane is dimethylamino-borane.

12. The electroplating bath of claim 11, wherein said bath further includes wetting agents and stress relief agents.

13. A method of forming a foil of a ternary alloy consisting essentially of nickel, cobalt, and boron, the method comprising electrolytically depositing nickel, cobalt and boron as said alloy on an unactivated substrate, said substrate having a low conductivity.

14. The method of claim 13 wherein said substrate is a titanium substrate.

* * * * *